(No Model.)  2 Sheets—Sheet 1.

J. C. KITTON.
ICE MACHINE.

No. 311,013.  Patented Jan. 20, 1885.

Witnesses,
Geo. H. Strong.
J. S. Sourse.

Inventor,
J. C. Kitton
By Dewey & Co.
Attorneys (No Model.) 2 Sheets—Sheet 2.

J. C. KITTON.
ICE MACHINE.

No. 311,013. Patented Jan. 20, 1885.

Witnesses,
Geo. H. Strong.

Inventor,
J. C. Kitton
By Dewey & Co.
Attorneys

UNITED STATES PATENT OFFICE.

JOHN C. KITTON, OF SAN FRANCISCO, CALIFORNIA.

ICE-MACHINE.

SPECIFICATION forming part of Letters Patent No. 311,013, dated January 20, 1885.

Application filed April 21, 1884. (No model.)

*To all whom it may concern:*

Be it known that I, JOHN C. KITTON, of the city and county of San Francisco, and State of California, have invented an Improvement in Ice-Machines; and I hereby declare the following to be a full, clear, and exact description thereof.

My invention relates to certain improvements in ice-machines; and it consists of a tank within which the freezing medium is contained, a series of wedge-shaped chambers formed within the tank, so as to be surrounded by the freezing medium without connecting with it, these chambers being widest at the bottom, and having relief-pipes for expansion and the discharge of condensed water.

My invention further relates to certain details of construction, all of which will be more fully explained by reference to the accompanying drawings, in which—

Figure 1:
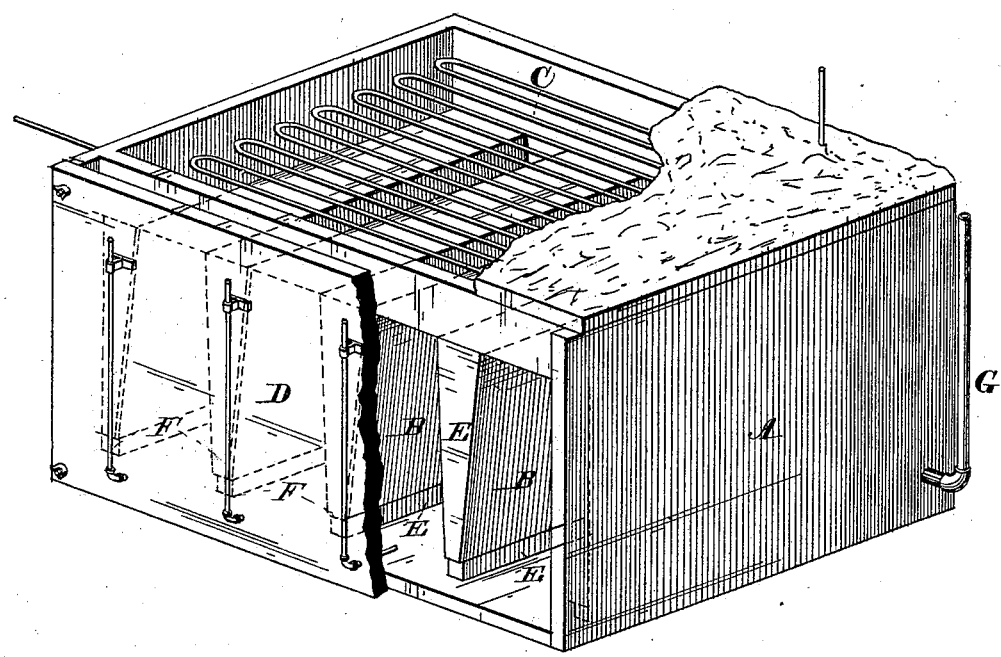
Figure 2:
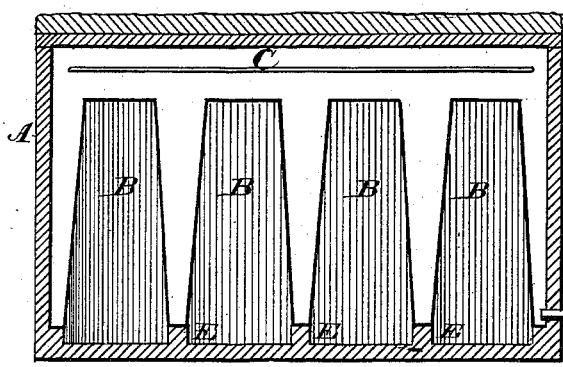
Figure 3:
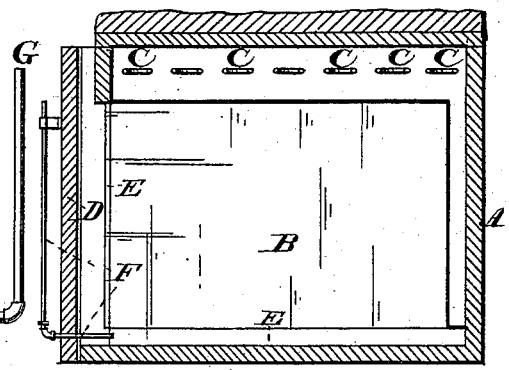
Figure 4:
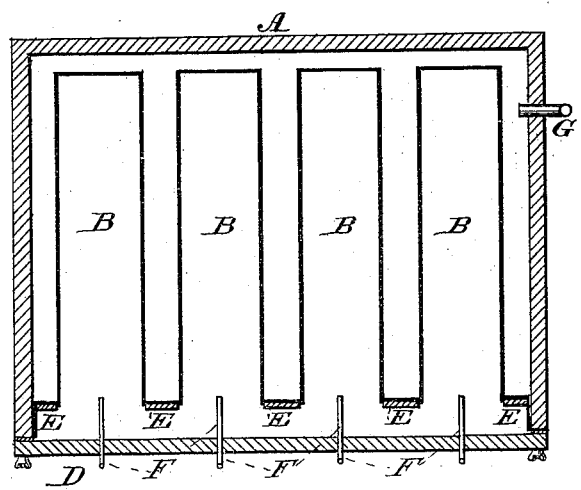

Figure 1 is a perspective view of my apparatus. Fig. 2 is a vertical section taken transversely through the freezing-chambers. Fig. 3 is a vertical transverse section of the apparatus, taken longitudinally through one of the chambers. Fig. 4 is a horizontal section of a part of one end of the tank, showing a portion of some of the chambers.

A is a tank of any convenient or suitable size. Within this tank are formed chambers B, which extend across from side to side, with the top and one end closed and the bottom and the other end open. A transverse section of these chambers shows them to be narrower at the top than at the bottom, so that after ice has been formed within them it may be loosened and will easily fall out. These chambers are closed at one end, and there is a space between their closed ends and the side of the outer tank, A, to allow the salt-water or freezing medium to flow around the ends, as well as between the chambers and over their tops. Pipes C are fixed in the tank A above the chambers B, passing back and forward through the freezing medium, and the ammonia, ether, or other substance which may be used to produce the proper degree of cold is passed through these pipes and acts in the usual manner. The connected pumps, condensers, &c., may be of any of the usual or well-known forms, and are not here shown. The side D of the tank A toward which the chambers B open is removable, secured with screw-bolts and nuts, and has a rubber or other packing to prevent leakage when in place. The closed ends of the salt-water spaces, which are toward the removable side D, are covered with a packing or filling, E, of non-conducting material, which prevents the water from being frozen opposite these ends. The bottoms of these salt-water spaces are a short distance above the bottom of the tank, and may have similar non-conducting strips or supports below them, as shown in Figs. 1 and 3. A space of non-freezing water is thus left between the side D and the ends of the salt-water chambers, through which communication is kept up between the fresh-water chambers, and this allows air remaining in the water to be forced out as it freezes.

In order to allow for the expansion of the water in the chambers as it begins to freeze, tubes F extend through the side D and open into the chambers B, below the level of the bottom of the salt-water spaces, which lie between the chambers. Outside the tank these tubes extend up to a point about the level of the water which is inside. When the freezing commences, it takes place from both sides, the top, and one end of each chamber, and the impurities in the water are thrown down to the bottom as the freezing progresses, and are forced out with any surplus water by the expansion of the ice as it freezes. By this construction of the chambers I am enabled to freeze the water very rapidly, and to produce a very pure and solid ice from ordinary water without boiling and condensing in the usual manner. After it is frozen solid to a point level with the bottom of the salt-water chambers the salt-water is drawn off through a pipe, G, and warm water, steam, or hot air, or other medium is admitted to loosen the ice from the sides of the chambers. It then drops down into the space below the level of the salt-water chambers, doing this readily on account of the tapering or wedge shape of the chambers. The side D is then removed and the blocks of ice drawn out, the small amount of water and impurities remaining being also discharged. The side being replaced, the salt-water returned, and the chambers being refilled with fresh water, the apparatus is again ready for work. By this apparatus I am enabled to use water in its ordinary condition without first boiling and condensing it to remove impurities, as is customary in ice-machines. The impurities are forced out or rejected as the water freezes and fall to the bottom, from which they are forced out through the overflow-pipes by expansion, or drawn off when the ice is removed. The air is also forced out, so that instead of being retained in the ice and making it white, the ice will be pure and solid, and it may be frozen at a lower temperature than usual without being white or impure.

Having thus described my invention, what I claim as new, and desire to secure by Letters Patent, is—

1. In an ice-machine, a tank having alternate salt and fresh water spaces formed by metal sides united at alternate ends, so that the salt-water spaces are open at one end and the top and the fresh-water spaces at the opposite end and the bottom, the two being unconnected, substantially as herein described.

2. In an ice-machine, an exterior tank, alternate fresh and salt water spaces formed by metal plates united, so that the fresh-water chambers are surrounded by those containing salt-water, except at the bottom and one end, and pipes C, extending through the salt-water chambers, substantially as herein described.

3. In an ice-machine, freezing-chambers made wedge-shaped in transverse section, or narrower at the top than at the bottom, and open at one end and below, and corresponding spaces or chambers for the salt-water or freezing medium between them at one end and over the top, together with a containing-tank having a removable side opposite the open ends of the freezing-chambers, substantially as herein described.

4. In an ice-machine, wedge-shaped freezing-chambers made narrower at the top than at the bottom, open at one end and below, with inclosing spaces for salt-water or a freezing medium, an exterior containing-tank with a removable side opposite the open ends of the freezing-chambers, and pipes opening through this side into the chambers below the point to which the freezing is carried, substantially as herein described.

5. In an ice-machine, wedge-shaped freezing-chambers made narrower at the top than at the bottom, open at one end and below, with surrounding spaces for salt-water or a freezing medium, an inclosing tank with a removable side opposite the open ends of the freezing-chambers, and a non-conducting cover or packing for the ends of the salt-water spaces, which are between the open ends of the freezing-chambers, substantially as herein described.

In witness whereof I have hereunto set my hand.

JOHN C. KITTON.

Witnesses:
G. F. COOKE,
C. D. COLE.